United States Patent Office 3,773,949
Patented Nov. 20, 1973

3,773,949
CERTAIN s-TRIAZOLO[1,5-a]PYRIMIDINES FOR PREVENTING BRONCHOSPASM OR REDUCING BODY FAT
Michael Dukes Macclesfield, England, assignor to Imperial Chemical Industries Limited, London, England
No Drawing. Original application Aug. 14, 1969, Ser. No. 850,221, now Patent No. 3,689,488, dated Sept. 5, 1972. Divided and this application May 12, 1972, Ser. No. 252,727
Int. Cl. A61k 27/00
U.S. Cl. 424—251                 3 Claims

ABSTRACT OF THE DISCLOSURE

A series of novel 5-(or 7-) oxo or thioxo dihydro-s-triazolo[1,5-a]pyrimidine derivatives bearing an amino, substituted amino or carboxy derivative in the 2-position, an alkyl or alkenyl substituent in the 4-position and, optionally a halogen or alkyl substituent in the 6-position. These compounds prevent bronchospasm and are therefore useful in the treatment of asthma.

This is a division of application Ser. No. 850,221, filed Aug. 14, 1969 and now U.S. Pat. No. 3,689,488.

This invention relates to new heterocyclic compounds and in particular it relates to new triazolo-pyrimidine derivatives which are capable of preventing bronchospasm and are therefore useful in the treatment of diseases which involve spasm or constriction of the bronchial musclature, for example asthma or bronchitis. They also cause a reduction in body fat and are therefore of value in the treatment of obesity. Some of the new triazolo-pyrimidine derivatives also possess sedative and anorexiant activity and so are particularly useful in the treatment of obesity and conditions where inhibition of appetite and/or loss of weight would be desirable. In addition, the new triazolo-pyrimidine derivatives possess anti-allergic properties.

The invention relates to novel derivatives of s-triazolo[1,5-a]pyrimidine which has the following ring structure:

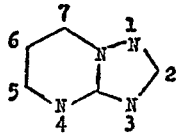

and is numbered as shown.

According to the invention there is provided a triazolo-pyrimidine derivative of the formula:

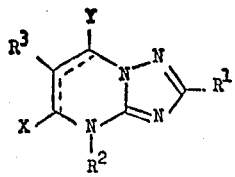

wherein $R^1$ stands for an amino radical, an amino radical bearing one or two acyl radicals of the formula $R^4 \cdot Cl-$ or $R^4 \cdot CS-$ wherein $R^4$ stands for an alkyl or alkoxy radical of 1–6 carbon atoms, or a phenyl or halophenyl radical, an alkylamino radical of 1–10 carbon atoms, a phenylalkylamino or (halophenyl)alkylamino radical of up to 15 carbon atoms, an acylated derivative of the latter three types of radical in which the acyl radical has the meaning stated above, a dialkylamino radical of up to 12 carbon atoms, a urea derivatives which optionally bears an alkyl radical of 1–6 carbon atoms or a phenyl or halophenyl radical as substituent, a carboxyl radical, a hydroxymethyl radical, or a carbamoyl or carbazoyl radical either of which optionally bears an alkyl radical of 1–6 carbon atoms as substituent; $R^2$ stands for an alkyl radical of 1–10 carbon atoms, a cycloalkyl radical of 3–6 carbon atoms, or an alkenyl radical of up to 4 carbon atoms; $R^3$ stands for hydrogen or a halogen atom, or for an alkyl or hydroxyalkyl radical of 1–10 carbon atoms; one of X and Y stands for an oxo or thioxo radical, and the other of X and Y stands for hydrogen or an alkyl radical of 1–4 carbon atoms, and, when X stands for an oxo or thioxo radical, the nucleus contains a double bond between the carbon atoms in positions 6 and 7, and, when Y stands for an oxo or thioxo radical, the nucleus contains a double bond between the carbon atoms in positions 5 and 6, and the pharmaceutically-acceptable base addition salts of a triazolo-pyrimidine derivative defined above which contains an acidic group.

Particularly suitable acyl radicals which may be present on an amino radical to form a value for $R^1$ are one or two acyl radicals of the formula $R^4 \cdot CO-$, wherein $R^4$ is an alkyl or alkoxy radical of 1–4 carbon atoms, or a phenyl or chlorophenyl radical, or one acyl radical of the formula $R^4 \cdot CS-$, wherein $R^4$ is an alkoxy radical of 1–4 carbon atoms. Specific values for such an acylamino radical are, for example an acetamido, diacetylamino, ethoxycarbonylamino, ethoxythiocarbonyl or p-chlorobenzamido radical.

A particularly suitable value for $R^1$ when it stands for an alkylamino radical is such a radical of 1–6 carbon atoms, for example a methylamino, ethylamino, n-propylamino, isopropylamino or n-butylamino radical, and a particularly suitable value for $R^1$ when it stands for a phenylalkylamino or (halophenyl)alkylamino radical is such a radical of 7–10 carbon atoms, for example a benzylamino or p-chlorobenzylamino radical, and particularly suitable acylated derivatives thereof are such radicals in which the acyl radical is an alkylcarbonyl or alkoxycarbonyl radical of 2–5 carbon atoms, for example an N-ethoxycarbonyl-N-methylamino, N-ethoxycarbonyl-N-α-phenylethylamino, N-benzylacetamido or N-ethylacetamido radical.

A particularly suitable value for $R^1$ when it stands for a dialkylamino radical is such a radical containing 1–6 carbon atoms in each alkyl radical, for example a dimethylamino, di-n-propylamino or di-n-butylamino radical, and a particularly suitable value for $R^1$ when it stands for a urea derivative is, for example a 3-phenylureido or 3-methylureido radical.

A particularly suitable alkyl radical which may be a substituent on a carbamoyl or carbazoyl radical when such a radical is a value for $R^1$, is, for example, a methyl or ethyl radical.

A particularly suitable value for $R^2$ when it stands for an alkyl radical is such a radical of 1–6 carbon atoms, for example a methyl, ethyl, n-propyl, isopropyl, n-butyl or s-butyl radical, and a particularly suitable value for $R^2$ when it stands for an alkenyl or cycloalkyl radical is, for example an allyl or cyclopentyl radical.

A particularly suitable value for $R^3$ when it stands for a halogen atom is a chlorine or bromine atom, and a particularly suitable value for $R^3$ when it stands for an alkyl or hydroxyalkyl radical is such a radical of 1–6 carbon atoms, for example a methyl, n-propyl, n-butyl or β-hydroxyethyl radical.

A particularly suitable value for X or Y when it stands for an alkyl radical is, for example, a methyl radical.

Examples of particularly suitable base addition salts are alkali metal and alkaline earth metal salts such as sodium, potassium or calcium salts.

A preferred group of triazolo-pyrimidine derivatives of the invention comprises those compounds in which $R^1$ stands for an amino radical, an amino radical bearing one or two acyl radicals of the formula R⁴·CO— or R⁴·CS—, wherein R⁴ stands for an alkyl or alkoxy radical of 1–4 carbon atoms or a phenyl or chlorophenyl radical, an alkylamino radical of 1–4 carbon atoms, a benzylamino or chlorobenzylamino radical, an acylated derivative of these latter three types of radical in which the acyl radical has the formula R⁴·CO—, wherein R⁴ has the meaning stated above, a dialkylamino radical in which each alkyl radical is of 1–4 carbon atoms, a urea derivative optionally bearing a methyl, phenyl or chlorophenyl substituent, a hydroxymethyl, carbamoyl or carbazoyl radical; R² stands for an alkyl radical of 1–4 carbon atoms or an allyl or cyclopentyl radical; R³ stands for hydrogen or an alkyl or hydroxyalkyl radical of 1–4 carbon atoms; X stands for an oxo or thioxo radical; Y stands for hydrogen or a methyl radical and the nucleus contains a double bond between the carbon atoms in positions 6 and 7. Of this group, particularly preferred compounds are those wherein R² is an n-propyl radical, R³ is a methyl radical, X is an oxo radical and Y is a hydrogen atom.

Specific triazolo-pyrimidine derivatives of the invention are illustrated by the accompanying examples, and of these, compounds showing particularly high activity in preventing bronchospasm are as follows.

Derivatives of 5-oxo-4,5-dihydro-s-triazolo[1,5-a]pyrimidine:

2-amino-6-methyl-4-n-propyl-
2-acetamido-6-methyl-4-n-propyl-
6-methyl-4-n-propyl-2-n-propylamino-
2-amino-6-methyl-4-n-butyl-
2-amino-6-methyl-4-allyl-
2-amino-7-methyl-4-n-propyl-
2-dimethylamino-6-methyl-4-n-propyl-
2-di-n-propylamino-6-methyl-4-n-propyl-
2-isopropylamino-6-methyl-4-n-propyl-
2-p-chlorobenzamido-6-methyl-4-n-propyl-
2-ethoxythiocarbonylamino-6-methyl-4-n-propyl-
2-ethoxycarbonylamino-6-methyl-4-n-propyl-
2-(3-phenylureido)-6-methyl-4-n-propyl-
2-amino-4,6-di-n-propyl-
2-N,N-diacetylamino-6-methyl-4-n-propyl-
2-N-ethoxycarbonyl-N-α-phenylethylamino-6-methyl-4-n-propyl-
2-amino-6-methyl-4-s-butyl-
2-amino-6-methyl-4-cyclopentyl-
2-amino-6-n-butyl-4-n-propyl- Derivatives of 7-oxo - 4,7 - dihydro-s-triazolo[1,5-a]pyrimidine:

2-n-propylamino-6-methyl-4-n-propyl-
2-amino-4,6-di-n-propyl-
and 2-amino-6-methyl-4-n-propyl-5-thioxo-4,5-dihydro-s-triazolo[1,5-a]pyrimidine, Compounds showing particularly high activity in reducing body fat are:

2-amino-6-methyl-5-oxo-4-n-propyl-4,5-dihydro-s-triazolo[1,5-a]pyrimidine,
s-triazolo[1,5-a]pyrimidine.
2-ethoxycarbonylamino-6-methyl-5-oxo-4-n-propyl-4,5-dihydro-s-triazolo[1,5-a]pyrimidine.

Compounds showing particularly useful anorexiant activity are:

2-amino-6-methyl-5-oxo-4-n-propyl-4,5-dihydro-s-triazolo[1,5-a]pyrimidine,
2-benzylamino-6-methyl-5-oxo-4-n-propyl-4,5-dihydro-s-triazolo[1,5-a]pyrimidine,
and 2-amino-4,6-di-n-propyl-5-oxo-4,5-dihydro-s-tri-
2-n-propylamino-6-methyl-5-oxo-4-n-propyl-4,5-dihydroazolo[1,5-a]pyrimidine.

According to a further feature of the invention there is provided a process for the manufacture of a triazolo-pyrimidine derivative of the invention wherein X or Y stands for an oxo radical, but wherein R¹ does not stand for a carbazoyl radical or a urea derivative and R³ does not stand for a halogen atom, which comprises the condensation of a triazole derivative of the formula:

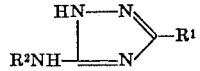

wherein R² has the meaning stated above, and R¹ has the meaning stated above apart from a carbazoyl radical or a urea derivative, with an unsaturated ester of the formula:

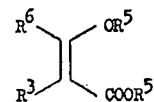

wherein R³ has the meaning stated above other than a halogen atom, R₅ stands for an alkyl radical of 1–4 carbon atoms, and R⁶ stands for hydrogen or an alkyl radical of 1–4 carbon atoms.

When the above condensation is carried out under basic conditions, the product obtained is a triazolo-pyrimidine derivative of the invention wherein X stands for an oxo radical. Such basic conditions may be obtained by carrying out the condensation in the presence of a base, for example an alkali metal alkoxide, for example sodium ethoxide. The condensation under basic conditions is conveniently carried out in the presence of a diluent or solvent, for example ethanol, and it may be accelerated or completed by heating, for example, to a temperature of from 50° C. to 150° C.

When the condensation is carried out under acidic conditions, the product obtained is a triazolo-pyrimidine derivative of the invention wherein Y stands for an oxo radical. The condensation is conveniently carried out in the presence of an acidic solvent, for example acetic acid, optionally in the presence of another solvent, for example dimethylformamide. The condensation may be accelerated or completed by heating, for example, to a temperature of from 50° C. to 150° C.

When the condensation is carried out under substantially neutral conditions, for example direct condensation of the reactants in an inert solvent, the product obtained is a triazolo-pyrimidine of the invention wherein X is an oxo radical.

It should be noted that if, in the triazole derivative employed in the above condensations, R¹ stands for an alkylamino, phenylalkylamino or (halophenyl)alkylamino radical, and this group is different from the group —NHR², then the condensations will lead to a mixture of two products in which the values of R² and the radical forming part of the substituted amino group R¹, are reversed, and separation of such a mixture may be necessary.

According to a further feature of the invention there is provided a process for the manufacture of a triazolo-pyrimidine of the invention wherein Y stands for an oxo radical but wherein R¹ does not stand for a carbazoyl radical or a urea derivative, which comprises the condensation of a triazole derivative of the formula:

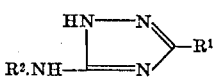

wherein R² has the meaning stated above and R¹ has the meaning stated above apart from a carbazoyl radical or a urea derivative, with a β-keto-ester of the formula:

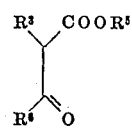

wherein R³, R⁵ and R⁶ have the meanings stated above.

The condensation may be carried out under basic conditions, for example in the presence of an alkali metal alkoxide, for example sodium ethoxide, preferably in a diluent or solvent, for example ethanol, or it may be carried out under acidic conditions, for example in the presence of an acidic solvent, for example acetic acid, optionally in the presence of another solvent, for example dimethylformamide. In each case, the reaction may be accelerated or completed by heating, for example, to a temperature of from 50° C. to 150° C.

According to a further feature of the invention there is provided a process for the manufacture of a triazolo-pyrimidine derivative of the invention wherein X or Y stands for an oxo radical, but wherein $R^1$ does not stand for a carbamoyl or carbazoyl radical or a urea derivative, which comprises the reaction of triazolo-pyrimidine derivative of the formula:

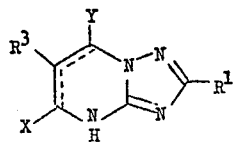

(II)

wherein X and Y have the meanings stated above apart from a thioxo radical, $R^3$ has the meaning stated above, and $R^1$ has the meaning stated above apart from a carbamoyl or carbazoyl radical or a urea derivative, with a compound of the formula $R^2-Q$, wherein $R^2$ has the meaning stated above and Q stands for a halogen atom, or for a radical of the formula $-O \cdot SO_2 \cdot OR^2$ or $$-O \cdot SO_2 \cdot R^9$$

wherein $R^9$ is a phenyl radical optionally bearing an alkyl substituent of 1–3 carbon atoms, for example the p-tolyl radical.

The reaction may be carried out in the presence of a diluent or solvent, for example dimethylformamide, and in the presence of a base, for example an alkali metal hydride, for example sodium hydride. If desired, the base may be used to prepare an alkali metal derivative of the triazolo-pyrimidine derivative used as starting material before the compound of the formula $R^2-Q$ is added to the reaction mixture.

The triazolo-pyrimidine derivative of Formula II, wherein $R^1$ stands for an amino radical and X stands for an oxo radical, used as starting material in the above process, may be obtained by the condensation of guanazole, that is 3,5-diamino-(1,2,4)-triazole, with an ester of the formula:

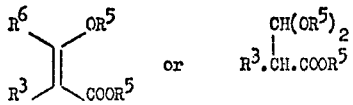

wherein $R^3$, $R^5$ and $R^6$ have the meanings stated above, under basic conditions; or with an unsaturated malonic ester of the formula:

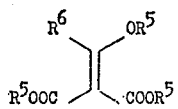

followed by hydrolysis of the alkoxycabonyl radical in the 6-position of the product to a carboxyl radical ad subsequent decarboxylation of this latter product to give a triazolo-pyrimidine derivative wherein $R^3$ is hydrogen.

The triazolo-pyrimidine derivative of Formula II, wherein $R^1$ stands for an amino radical and Y stands for an oxo radical, used as starting material in the above process may be obtained by the condensation of guanazole with an ester of the formula:

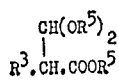

wherein $R^3$ and $R^5$ have the meanings stated above, under neutral conditions, for example heating the reactants in dimethylformamide.

The triazolo-pyrimidine derivative of Formula II, wherein $R^1$ is an amino radical bearing one or two alkyl, phenylalkyl or acyl radicals or is a urea derivative, may be obtained by conventional procedures from the corresponding compound wherein $R^1$ is an amino radical.

The triazolo-pyrimidine derivative of Formula II, wherein $R^1$ is a carbamoyl or carbazoyl radical, may be obtained by conventioned procedures from the corresponding compound wherein $R^1$ is a carboxyl radical, which is itself obtained by oxidation of the corresponding compound wherein $R^1$ is a hydroxymethyl radical.

According to a further feature of the invention there is provided a process for the manufacture of a triazolo-pyrimidine of the invention wherein X or Y stands for an oxo radical and $R^1$ stands for a radical of the formula $-NHR^8$, wherein $R^8$ stands for hydrogen or an alkyl radical of 1–10 carbon atoms, or a phenylalkyl or (halophenyl)alkyl radical of up to 15 carbon atoms apart from an α-phenylalkyl or α-(halophenyl)alkyl radical, which comprises the catalytic hydrogenolysis of a triazolo-pyrimidine derivative of the formula:

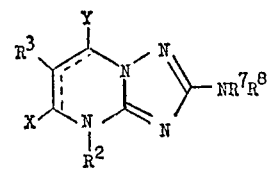

(III)

wherein X and Y have the meanings stated apart from a thioxo radical, $R^2$, $R^3$ and $R^8$ have the meanings stated above and $R^7$ stands for an α-phenylalkyl radical of 7–10 carbon atoms, for example a benzyl radical.

A suitable catalyst is a palladium on carbon catalyst, and the hydrogenolysis may be carried out in the presence of na acid, for example hydrochloric acid.

According to a further feature of the invention there is provided a process for the manufacture of a triazolo-pyrimidine derivative of the invention wherein $R^1$ stands for an amino, alkylamino, phenylalkylamino or (halophenyl)alkylamino radical which comprises the hydrolysis of a triazolo-pyrimidine derivative of the formula:

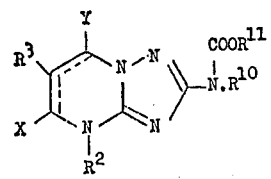

(IV)

wherein $R^2$, $R^3$, X and Y have the meanings stated above, $R^{10}$ stands for hydrogen or an alkyl radical of 1–10 carbon atoms or a phenylalkyl or (halophenyl)alkyl radical of up to 15 carbon atoms, and $R^{11}$ stands for an alkyl radical of 1–6 carbon atoms.

The hydrolysis may be conveniently carried out under alkaline conditions, for example in the presence of an alkali metal hydroxide, for example sodium hydroxide, optionally in the presence of an organic solvent, for example methanol.

The starting material of Formula IV, when $R^{10}$ stands for hydrogen, may be obtained by reaction of the corresponding triazolo-pyrimidine derivative of Formula I wherein $R^1$ stands for a carbazoyl radical with nitrous acid to form the acid azide followed by reaction with an alcohol of the formula $R^{11} \cdot OH$, and this process is also provided as a feature of the invention.

According to yet a further feature of the invention there is provided a process for the manufacture of a traizolo-pyrimidine derivative of the invention wherein X or Y stands for an oxo radical, and $R^1$ stands for a carboxyl radical which comprises the oxidation of a triazolo-pyrimidine derivative of the formula:

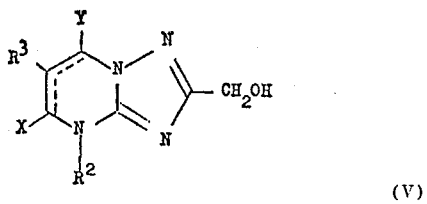

(V)

wherein X and Y have the meanings stated above apart from a thioxo radical, and $R^2$ and $R^3$ have the meanings stated above.

The oxidation is conveniently carried out by using any oxidising agent conventionally used for the conversion of a primary alcohol to an acid, for example chromium trioxide in concentrated sulphuric acid.

The triazolo-pyrimidine derivatives of the invention wherein X or Y stands for a thioxo radical, or $R^3$ stands for a halogen atom, or $R^1$ stands for a urea derivative may be obtained by subsequent modifications of the products of the above processes as follows:

(a) A triazolo-pyrimidine of the invention wherein X or Y stands for a thioxo radical may be obtained from the corresponding triazolo-pyrimidine wherein X or Y stands for an oxo radical by heating the latter at 100°–200° C. with phosphorous pentasulphide in a solvent, for example Tetralin, provided that no other carbonyl group is present.

(b) A triazolo-pyrimidine of the invention wherein $R^3$ stands for a halogen atom may be obtained by the nuclear halogenation of the corresponding triazolo-pyrimidine wherein $R^3$ stands for hydrogen, with, for example, chlorine or bromine in glacial acetic acid.

(c) A triazolo-pyrimidine of the invention wherein $R^1$ is a urea derivative, may be obtained by reacting the corresponding triazolo-pyrimidine wherein $R^1$ stands for an amino radical, with an isocyanate.

It is to be understood that the various values of $R^1$ may be interconverted by the known procedures of organic chemistry, and these procedures provide alternatives to the processes set out above for the manufacture of a triazolo-pyrimidine derivative of the invention, and are provided as further features of the invention.

Thus a compound of Formula I wherein $R^1$ is an alkylamino, dialkylamino, phenylalkylamino or (halophenyl) alkylamino radical may also be obtained by alkylation of the corresponding derivative wherein $R^1$ stands for an amino radical. Such alkylation may be carried out using for example, an alkyl halide and a base, for example sodium hydride, in an inert solvent, for exmple dimethylformamide.

A triazolo-pyrimidine of the invention wherein $R^1$ stands for an acylamino or acylated derivative of a monosubstituted amino radical may be obtained by acylation of the corresponding triazolo-pyrimidine wherein $R^1$ stands for an amino or mono-substituted amino radical, with a suitable acylating agent, for example a reactive derivative of an acid of the formula $R^4 \cdot COOH$ or $R^4 \cdot SC \cdot OH$ wherein $R^4$ has the meaning stated above, for example acetic anhydride, p-chlorobenzoyl chloride or ethyl chloroformate optionally in the presence of pyridine.

Alternatively, compounds wherein $R^4$ is an alkoxy radical may be obtained by reaction of an alkanol with an isocyanate or isothiocyanate derived from the triazolo-pyrimidine wherein $R^1$ stands for an amino group.

As a further alternative, compounds of Formula I wherein $R^1$ is an acylated derivative of an alkylamino, phenylalkylamino or (halophenyl)alkylamino radical, may be obtained by alkylation of the corresponding compound wherein $R^1$ is an amino radical bearing one acyl group of the formula $R^4 \cdot CO-$ or $R^4 \cdot CS-$, wherein $R^4$ has the meaning stated above.

Finally, a compound of Formula I wherein $R^1$ is a carbamoyl or carbazoyl radical may be obtained by esterifying the corresponding compound wherein $R^1$ is a carboxyl radical, and then converting such an alkoxycarbonyl derivative into a carbamoyl or carbazoyl derivative by reaction with ammonia or hydrazine respectively.

The activity of the triazolo-pyrimidine derivatives of the invention in preventing bronchospasm is demonstrated by their action in preventing the death of guinea pigs exposed to a histamine aerosol, according to the standard test procedure for such activity. The triazolo-pyrimidine derivatives of this invention are at least as potent in this test as theophylline, and many compounds are more potent. When such compounds are used to treat asthma in humans, a typical dose is from 1 to 200 mg. per man, or from 1 to 25 mg. per man of the most highly active compounds, administered orally or parenterally at intervals as required by the patient depending upon the risk of asthmatic attack.

The activity of the triazolo-pyrimidine derivatives in reducing body fat is demonstrated by their action in reducing the uterofat depot in mice, and the anorexiant activity is demonstrated by the suppression of the food intake of mice and rats. When such compounds are used as anorexiants in humans, a typical daily oral dose is from 5 mg. to 100 mg.

The anti-allergic effects of the new triazolo-pyrimidine derivatives are demonstrated by their inhibition of anaphylaxis in mice or guinea pigs.

The triazolo-pyrimidine derivatives of the invention may be administered to patients in the form of pharmaceutical compositions.

According to a further feature of the invention there is provided a pharmaceutical composition comprising at least one triazolo-pyrimidine derivative of the invention together with a pharmaceutically-acceptable diluent or carrier.

The compositions may be in a form suitable for oral administration, for example tablets, capsules, syrups or linctuses, or they may be in a form suitable for parenteral administration, for example sterile injectable aqueous or oily solutions or suspensions. Preferred compositions for use to prevent bronchospasm are orally administrable compositions and preferred compositions for use as an anorexiant are tablets or capsules, optionally containing vitamins or carboxymethyl celluloses.

When used for the treatment of allergic reactions, especially of the skin, the composition may be in a form suitable for topical administration, for example an ointment or cream.

When used to prevent bronchospasm, the triazolo-pyrimidine derivatives of the invention may be administered together with other compounds which are known to prevent bronchospasm. Such other compounds are, for example, aminophylline which is administered orally or by injection, ephedrine which is administered orally, sympathomimetic amines, for example isoprenaline or adrenaline which are administered as aerosols, or those corticosteroids which are used to control asthma, for example prednisolone. Administration together with a compound possessing anti-histamine properties, for example mepyramine, is particularly useful since, although operating by different mechanisms, both types of drugs are effective in inhibiting a histamine-induced bronchospasm.

The triazolo-pyrimidine derivatives of the invention may also be administered together with a $\beta$-adrenergic blocking agent, for example 1-(4-acetamidophenoxy)-3-isopropylamino-2-propanol, which will inhibit any sympathomimetic action of the traizolo-pyrimidine derivative on the heart, but not affect the action of the traizolo-pyrimidine derivative on the bronchial musculature.

The invention is illustrated but not limited by the following examples.

EXAMPLE 1

3-benzylamino - 5-n-propylamino-(1,2,4)triazole (12.5 g.) and methyl β-methoxy-α-methyl-acrylate (7.5 g.) were dissolved in anhydrous ethanol (30 ml.) containing sodium ethoxide derived from sodium hydride/oil dispersion (2.75 g. 50% w./w.), and the solution boiled under reflux for 48 hours. The ethanol was then evaporated under reduced pressure, water (25 ml.) added and the pH adjusted to pH 4 with 2 N-hydrochloric acid. The suspension was extracted with chloroform (3× 50 ml.), and the extract then washed with water (25 ml.), dried and evaporated to give an oil which was chromatographed on a column of neutral alumina (Woelm, grade II; 300 g.). After removal of an oil with 10% ethyl acetate in hexane (4× 200 ml. fractions) a solid was eluted by 30% ethyl acetate in hexane (6× 200 ml. fractions), which was crystallised from a mixture of ether and hexane to give a mixture of 2-benzylamino-6-methyl-5-oxo-4-n-propyl-4,5-dihydro-s- triazolo[1,5-a]pyrimidine (65%) and 4-benzyl - 6 - methyl-5-oxo-2-n-propylamino-4,5-dihydro-s-triazolo[1,5-a]pyrimidine (35%), M.P. 82–84° C.

The 3-benzylamino-5-n-propylamino - 1,2,4 - triazole, used as starting material was prepared as follows:

N-n-propyl-S-ethyl-isothiourea hydrobromide (45.4 g.) was dissolved in water (100 ml.) containing sodium hydroxide (8 g.) and to this stirred solution was added a solution of benzylisothiocyanate (30 g.) in ethanol (100 ml.). After 4 hours the stirring was stopped and the suspension then left for 16 hours. The bottom layer was separated, diluted with ether (250 ml.), and the solution washed with water (2× 50 ml.) and then dried over magnesium sulphate. Evaporation gave 1-benzyl4-ethyl-5-n-propyl-4-isodithiobiuret as an oil, 40 g. of which was allowed to stand with ethyl iodide (45 g.) in ethanol (500 ml.) at ambient temperature for 4 days. The solvent was evaporated and the resulting oil shaken with 4 N-sodium carbonate (50 ml.) and hexane (300 ml.). The hexane solution was separated, washed with water (50 ml.) and dried over magnesium sulphate. Evaporation of the hexane gave 1-benzyl-2,4-diethyl-5-n-propyl - 2,4 - diiso-dithiobiuret as an oil, which was used without purification for the next stage.

Hydrazine hydrate (20 ml., 64%) was added to the above diiso-dithiobiuret (23.5 g.) in ethanol (75 ml.) and the solution boiled under reflux for 16 hours. On evaporation an oily solid was obtained which was stirred with ether and filtered. The resulting solid was crystallised from ethyl acetate to give 3-benzylamino-5-n-propylamino-1,2,4-triazolo, M.P. 164° C.

EXAMPLE 2

The mixture of isomeric triazolo-pyrimidines (6 g.) obtained as described in Example 1, was dissolved in ethanol (50 ml.) containing concentrated hydrochloric acid (0.1 ml.), and the solution was shaken under hydrogen at 1 atmosphere pressure and at ambient temperature, in the presence of 5% palladium on charcoal (3 g.) for 10 days. The catalyst was then filtered off, the solution evaporated, and the residual solid chromatographed on a column of silica gel (200 g. Ethyl acetate (4× 100 ml. fractions) eluted a gum which crystallised from a mixture of ether and hexane to give 4-benzyl-6-methyl - 5 - oxo-2-n-propylamino-4,5-dihydro-s-triazolo-[1,5-a]pyrimidine, M.P. 102–104° C.

Continued elution with 50% ethanol in ethyl acetate (4× 100 ml. fractions) gave a solid which crystallised from ethanol to give 2-amino-6-methyl-5-oxo-4-n-propyl-4,5-dihydro-s-triazolo[1,5-a]pyrimidine, which, on heating, shows progressive decomposition above 158° C.

EXAMPLE 3

3-benzylamino-5-n-propylamino - 1,2,4 - triazole (12.5 g.) and methyl β-methoxy-α-methyl-acrylate (10 g.) were dissolved in glacial acetic acid (25 ml.) and the solution boiled under reflux for 50 hours. The solution was cooled, diluted with water (100 ml.) and extracted with chloroform (3× 80 ml.). The chloroform solution was washed with 5% sodium hydrogen carbonate solution (100 ml.), then water (30 ml.) and dried over magnesium sulphate. The residue obtained on evaporation of the chloroform was triturated with hexane (50 ml.) and the solid filtered. Crystallisation from a mixture of ethyl acetate and hexane gave a mixture of 2-benzylamino-6-methyl-7-oxo-4-n-propyl - 4,7 - dihydro-s-triazolo[1,5-a]pyrimidine (ca. 65%) and 4-benzyl-6-methyl-7-oxo-2-n-propylamino-4,7-dihydro-s-triazolo[1,5-a]pyrimidine (ca. 35%), M.P. 84–85° C.

EXAMPLE 4

2-amino-6-methyl-5-oxo-4-n-propyl - 4,5 - dihydro-s-triazolo[1,5-a]pyrimidine (0.80 g.) was heated with acetic anhydride (2.0 g.) at 100° C. for 30 minutes. After then standing with ethanol (4 ml.) for 30 minutes the solution was diluted with water (25 ml.) and extracted with chloroform (3× 50 ml.). The chloroform solution was washed with 5% sodium hydrogen carbonate solution (50 ml.), then with water (25 ml.) and then dried over magnesium sulphate. Evaporation of the chloroform and crystallisation from a mixture of ether and hexane gave 2-acetamido-6-methyl-5-oxo-4-n-propyl-4,5-dihydro-s-triazolo[1,5-a]pyrimidine, M.P. 165–167° C.

EXAMPLE 5

The mixture of 2-benzylamino - 6 - methyl-5-oxo-4-n-propyl - 4,5 - dihydro-s-triazolo[1,5-a]pyrimidine and 4-benzyl - 6 - methyl - 5 - oxo-2-n-propylamino-4,5-dihydrotriazolo[1,5-a]pyrimidine (10 g.), obtained as described in Example 1, was treated with acetic anhydride (10 ml.) in refluxing pyridine (20 ml.) for 5 hours. Ethanol (15 ml.) was added and after 30 minutes the solution was cooled, diluted with ether (250 ml.) and washed successively with 2 N-hydrochloric acid (2× 100 ml. portions), water (25 ml.), 5% sodium hydrogen carbonate solution (2× 50 ml.) and water (25 ml.). After drying over magnesium sulphate the ether was evaporated, and the resulting solid on crystallisation from cyclohexane and then ethyl acetate gave 2-N-benzylacetamido-6-methyl - 5 - oxo - 4 - n-propyl-4,5-dihydro-s-triazolo[1,5 - a]pyrimidine, M.P. 119–121° C., the corresponding 4-benzyl - 6 - methyl-5-oxo-2-N-n-propylacetamido-4,5-dihydro - s - triazolo[1,5-a]pyrimidine being left in the mother liquors.

EXAMPLE 6

3,5-di-(n-propylamino)-1,2,4-triazole (5 g.) was dissolved in ethanol (30 ml.) containing sodium ethoxide derived from sodium hydride/oil dispersion (1.44 g., 50% w./w.) and methyl β-methoxy-α-methyl-acrylate (3.9 g.) added. The mixture was boiled under reflux for 24 hours when another 1.5 g. of the ester was added. Boiling was then continued for a further 14 hours. The ethanol was evaporated under reduced pressure, water (30 ml.) and chloroform (100 ml.) added and the aqueous phase brought to pH 5 with 2 N-hydrochloric acid. The chloroform layer was separated and the aqueous layer extracted twice with chloroform (50 ml.). The combined chloroform layers were washed with water (25 ml.) and dried over magnesium sulphate. The material recovered on evaporation of the solvent was chromatographed on a column of neutral alumina (200 g., Woelm grade II). After the removal of low-polarity oil with 20% ethyl acetate in hexane (4× 200 ml. fractions) a solid was eluted with 30% ethyl acetate in hexane (5× 200 ml. fractions) which crystallised from cyclohexane to give 6-methyl - 5 - oxo-4-n-propyl-2-n-propylamino-4,5-dihydro - s - triazolo[1,5 - a]pyrimidine, M.P. 127–128° C.

The 3,5-di-(n-propylamino)triazole, used as starting material was prepared as follows:

S-ethyl-N-n-propyl-isothiourea hydrobromide (192 g.) was treated with a solution of sodium hydroxide (33 g.) in water (380 ml.), followed by a solution of n-propyl-isothiocyanate (82 g.) in ethanol (380 ml.). The mixture was stirred for 4 hours, the two layers then separated, and the upper layer diluted with ether (200 ml.) and dried over magnesium sulphate. Evaporation of the solvent gave 1,5-di-n-propyl - 2 - ethyl - 2 - isodithiobiuret as an oil, which was used for the next stage without purification.

A solution of the above iso-dithiobiuret (188 g.) and ethyl iodide (230 g.) in ethanol (2,000 ml.) was left for 6 days at ambient temperature and the solvent then evaporated under reduced pressure. The resulting oil was shaken with hexane (500 ml.) and a solution of sodium carbonate (100 g.) in water (500 ml.) for 30 minutes. The hexane layer was separated, washed with water (50 ml.) and dried over magnesium sulphate. Evaporation of the hexane gave 1,5-di-n-propyl-2,4-diethyl-2,4-di-iso-dithiobiuret as an oil, which was used for the next stage without purification.

The above di-iso-dithiobiuret (150 g.) in ethanol (500 ml.) was treated with hydrazine hydrate (60 g.) and the solution boiled under reflux for 16 hours. The solution was evaporated and the residual oily suspension stirred with ether (200 ml.) and filtered. The pasty-solid thus obtained was boiled with ethyl acetate (100 ml.), the liquors decanted and the residual solid crystallised from ethanol to give 3,5 - di-(n-propylamino)-1,2,4-triazole, M.P. 199–200° C.

EXAMPLE 7

3,5-di-(n-propylamino) - 1,2,4 - triazole (10 g.) and methyl β-methoxy - α - methyl-acrylate (6 g.) were dissolved in glacial acetic acid (20 ml.) and the mixture boiled under reflux for 50 hours. An additional 6 g. of the ester was added after 24 hours. The solution was diluted with water (100 ml.) and the suspension extracted with chloroform (3× 80 ml.). The combined chloroform extracts were washed with 5% sodium hydrogen carbonate solution (2× 50 ml.), then with water (25 ml.) and dried over magnesium sulphate. The chloroform was evaporated and the residue stirred with cyclohexane (30 ml.). The suspension was filtered and the solid was crystallised from ethyl acetate to give 6 - methyl-7-oxo-4-n-propyl-2-n-propylamino-4,7-dihydro - s - triazolo[1,5-a]pyrimidine, M.P. 152–154° C.

EXAMPLE 8

A solution of 2-amino - 6 - methyl - 5 - oxo - 4,5-dihydro - s - triazolo[1,5-a]pyrimidine (25 g.) in dry dimethylformamide (600 ml.) at 50° C. was added to sodium hydride (74 g.; 50% oil dispersion previously washed with 40–60° C. petroleum ether by decantation) and the mixture stirred at 60° C. until clear. 1-bromopropane (30 ml.) was added over 2 hours, with stirring, the temperature being maintained at 60–70° C. After 16 hours, the solution was evaporated in vacuo and the residue stirred to a paste with water (5 ml.), filtered and sucked dry. The solid was then suspended in ether (40 ml.) and filtered. The solid was then dissolved in 35% ethanol in ethyl acetate (400 ml.) and stirred with neutral alumina (250 g.) and the suspension filtered. The alumina was washed with 50% ethanol in ethyl acetate (750 ml.) and the combined filtrate and washings evaporated in vacuo. The residue was crystallised from ethyl acetate and then ethanol to give 2-amino-6-methyl-5-oxo-4-n-propyl - 4,5 - dihydro - s - triazolo[1,5-a]pyrimidine, M.P. 164–165° C.

The 2-amino - 6 - methyl - 5 - oxo - 4,5 - dihydro-s-triazolo[1,5-a]pyrimidine used as starting material may be obtained as follows:

Guanazole (60 g.) was dissolved in ethanol (460 ml.) containing sodium ethoxide (41.25 g.), and methyl β-methoxy - α - methyl - acrylate (86.8 g.) was added. The mixture was stirred and heated under reflux for 2 days, then cooled to 40° C. and water (330 ml.) added. The pH was adjusted to 4 with concentrated hydrochloric acid (54.5 ml.) and the 2-amino - 6 - methyl - 5 - oxo - 4,5-dihydro - s - triazolo[1,5-a]pyrimidine, M.P. 325° C., collected by filtration and washed with water (150 ml.), and acetone (150 ml.).

EXAMPLE 9

The procedure described in the first part of Example 8 was repeated except that the 1-bromopropane was replaced by a molecular equivalent proportion of iodomethane, 1-bromobutane or allyl bromide. There was thus obtained 2-amino - 4,6 - dimethyl - 5 - oxo - 4,5 - dihydro - s - triazolo[1,5-a]pyrimidine, M.P. 230–232° C., 2-amino - 6 - methyl - 5 - oxo-4-n-butyl - 4,5 - dihydro-s-triazolo[1,5-a]pyrimidine, M.P. 140–142° C., or 2-amino-6-methyl - 5 - oxo - 4 - allyl - 4,5 - dihydro-s-triazolo[1,5-a]pyrimidine, M.P. 208–210° C. respectively.

EXAMPLE 10

Using the general procedure described in the first part of Example 8, 2-amino - 7 - methyl - 5 - oxo - 4,5 - dihydro-s-[1,5-a]pyrimidine (2.0 g.) was alkylated with sodium hydride (0.6 g.; 50% oil dispersion) and 1-bromopropane (3 ml.) in dimethylformamide to give 2-amino-7-methyl - 5 - oxo - 4 - n - propyl - 4,5 - dihydro-s-triazolo[1,5-a]pyrimidine, M.P. 161–162° C.

The 2-amino - 7 - methyl - 5 - oxo - 4,5 - dihydro-s-[1,5-a]pyrimidine was obtained as follows:

By the general method described in the second part of Example 8, guanazole (20.1 g.) and diethyl α-ethoxyethylidene malonate (51.0 g.) were reacted to give 2-amino - 6 - ethoxycarbonyl - 7 - methyl - 5 - oxo - 4,5-dihydro-s-triazolo[1,5-a]pyrimidine, M.P. 202–204° C.

This ethoxycarbonyl derivative (16 g.) was boiled with 4 N-sodium hydroxide (70 ml.) for 90 minutes. The solution was then cooled and acidified with concentrated hydrochloric acid to pH 3, and the 2-amino-7-methyl-5-oxo - 4,5 - dihydro-s-triazolo[1,5-a]pyrimidine - 6 - carboxylic acid, M.P. 366° C. (decomposition), collected and washed with water.

This acid (12.5 g.) was heated at 310° C./1 mm. for 3 hours. Water (200 ml.) was added, and the suspension filtered. The solid was crystallised from water to give 2-amino - 7 - methyl - 5 - oxo - 4,5 - dihydro-s-triazolo[1,5-a]pyrimidine, M.P. 348–350° C.

EXAMPLE 11

Sodium hydride (3 g.; 50% oil dispersion) was stirred with iodomethane ( ml.) for 1 minute prior to the addition of dimethylformamide (25 ml.) and 2-amino-6-methyl - 5 - oxo - 4 - n - propyl - 4,5 - dihydro-s-triazolo[1,5-a]pyrimidine (3 g.). The mixture was stirred at ambient temperature for 1 hour, and then water (75 ml.) was added and the pH adjusted to 4 with dilute hydrochloric acid. The suspension was extracted with ether (3× 150 ml.) and the ether solution washed with water (3× 25 ml.) dried and evaporated in vacuo. The residual oil was chromatographed on neutral alumina (75 g.; grade II). After removing oil with hexane, 15% ethyl acetate in hexane eluted the 2-dimethylamino-6-methyl - 5 - oxo-4-n-propyl - 4,5 - dihydro-s-triazolo[1,5-a]pyrimidine, M.P. 128–130° C.

EXAMPLE 12

The process described in Example 11 was repeated except that the iodomethane was replaced by more than two molecular equivalent proportions of 1-bromopropane, 1-bromobutane or 2-bromopropane. There was thus obtained 2-di-n-propylamino - 6 - methyl - 5 - oxo-4-n-propyl - 4,5 - dihydro-s-triazolo[1,5-a]pyrimidine, M.P. 86–88° C., 2-di-n-butylamino - 6 - methyl-5-oxo-4-n- propyl - 4,5 - dihydro-s-triazolo[1,5-a]pyrimidine, M.P. 84–86° C., or 2-isopropylamino - 6 - methyl - 5 - oxo-4-n-propyl - 4,5 - dihydro-s-triazolo[1,5 - a]pyrimidine, M.P. 104–106° C. respectively.

EXAMPLE 13 p-Chlorobenzoylchloride (3.6 g.) was added to a solution of 2-amino - 6 - methyl-5-oxo-4-n-propyl-4,5-dihydro-s-triazolo[1,5-a]pyrimidine (4.2 g.) in pyridine (10 ml.), and the mixture boiled under reflux for 5 hours. The mixture was then poured into ethyl acetate (500 ml.) and the precipitate filtered and washed with water (60 ml.). The residual solid was crystallised from benzene to give 2-p-chlorobenzamido - 6 - methyl-5-oxo-4-n-propyl-4,5-dihydro-s-triazolo[1,5-a]pyrimidine, M.P. 186–187° C.

EXAMPLE 14

Thiophosgene (2.5 ml.) was suspended in water (50 ml.) with vigorous stirring, and 2-amino-6-methyl-5-oxo-4-n-propyl-4,5-dihydro - s - triazolo[1,5-a]pyrimidine (2 g.) in chloroform (25 ml.) added dropwise. After 1 hour, the chloroform layer was separated, dried and evaporated in vacuo. The residual isothiocyanate was boiled in ethanol (20 ml.) for six hours. The ethanol was then removed in vacuo, and the residue crystallised successively from ethyl acetate and hexane to give 2-ethoxythiocarbonylamino-6-methyl - 5 - oxo - 4 - n - propyl-4,5-dihydro-s-triazolo [1,5-a]pyrimidine, M.P. 122° C.

EXAMPLE 15

A stirred solution of 2-amino-6-methyl-5-oxo-4-n-propyl-4,5-dihydro-s-triazolo[1,5-a]pyrimidine (2 g.) in pyridine (20 ml.) was treated dropwise with ethyl chloroformate (2 ml.) in benzene (5 ml.). After 30 minutes the mixture was evaporated in vacuo and water (10 ml.), 2 N hydrochloric acid (10 ml.) and chloroform (100 ml.) added to the residue. The chloroform layer was separated, washed with water and dried and evaporated in vacuo. The resulting solid was crystallised from ethyl acetate to give 2-ethoxycarbonylamino - 6 - methyl-5-oxo-4-n-propyl-4,5-dihydro-s-triazolo[1,5-a]pyrimidine, M.P. 173° C.

EXAMPLE 16

A solution of 2-amino-6-methyl-5-oxo-4-n-propyl-4,5-dihydro-s-triazolo[1,5-a]pyrimidine (2.0 g.) and phenyl isocyanate (2.4 g.) in ethyl acetate (70 ml.) was refluxed for 18 hours. The resulting suspension was cooled and the 6 - methyl - 5 - oxo-2-(3-phenylureido)-4-n-propyl-4,5-dihydro-s-triazolo[1,5-a]pyrimidine, M.P. 228–230° C., collected and washed with ethyl acetate and ether.

EXAMPLE 17

Using the general procedure described in the first part of Example 8, 2-amino-5-oxo-6-n-propyl-4,5-dihydro-s-triazolo[1,5-a]pyrimidine (8.0 g.) was alkylated with sodium hydride (2.2 g.; 50% oil dispersion) and 1-bromopropane (9.0 ml.) in dimethylformamide (200 ml.). The resulting 2 - amino - 4,6 - di-n-propyl-5-oxo-4,5-dihydro-s-triazolo-[1,5-a]pyrimidine, M.P. 112–113° C., was crystallised from benzene.

The 2 - amino-5-oxo-6-n-propyl-4,5-dihydro-s-triazolo-[1,5-a]pyrimidine, M.P. 236–237° C., was prepared from guanazole and ethyl α-(diethoxymethyl)valerate, by the general method described in the second part of Example 8.

EXAMPLE 18

Using the general procedure described in the first part of Example 8, 2-amino-7-oxo-6-n-propyl-4,5-dihydro-s-triazolo[1,5-a]pyrimidine (3.4 g.) was alkylated with sodium hydride (0.93 g.; 50% oil dispersion) and 1-bromopropane (4 ml.) in dimethylformamide (100 ml.). The resulting 2 - amino - 4,6 - di-n-propyl-7-oxo-4,7-dihydro-s-triazolo[1,5-a]pyrimidine, M.P. 206–208° C., was crystallised from ethanol.

The 2 - amino - 7 - oxo-6-n-propyl-4,5-dihydro-s-triazolo[1,5-a]pyrimidine was prepared by refluxing a solution of guanazole (2 g.) and ethyl α-(diethoxymethyl) valerate (5 g.) in dimethylformamide (15 ml.) for 3 days. The suspension was cooled, filtered and the solid recrystallised from dimethylformamide to give the 2-amino-7-oxo-6 - n-propyl-4,5-dihydro-s-triazolo[1,5-a]pyrimidine, M.P. 359° (decomposition).

EXAMPLE 19

By the general method described in the first part of Example 8, 2-benzylamino-6-methyl-5-oxo-4,5-dihydro-s-triazolo[1,5-a]pyrimidine (1.5 g.) was alkylated with sodium hydride (0.3 g.; 50% oil dispersion) and 1-bromopropane (2.0 ml.) in dimethylformamide to give 2-benzylamino - 6 - methyl - 5 - oxo-4-n-propyl-4,5-dihydro-s-triazolo[1,5-a]pyrimidine, M.P. 102–105° C.

The 2 - benzylamino - 6 - methyl-5-oxo-4,5-dihydro-s-triazolo[1,5-a]pyrimidine, M.P. 229–231° C., was prepared from 3-amino-5-benzylamino - 1,2,4 - triazole and methyl β-methoxy-α-methylacrylate by the general method described in the second part of Example 8.

The 3-amino-5-benzylamino-1,2,4-triazole was prepared as follows:

S-ethylisothiourea hydrobromide (137 g.) in water (200 ml.) was treated with a solution of sodium hydroxide (20 g.) in water (50 ml.) followed immediately with benzylisothiocyanate (74.5 g.) in ethanol (200 ml.). After being stirred for 4 hours the mixture was extracted with ether (3 × 150 ml.) and the ether solution then washed with water (50 ml.), dried and evaporated. The resulting 1-benzyl-4-ethyl-4-iso-dithiobiuret (127 g.) was dissolved in ethanol (1,000 ml.) containing iodoethane (200 ml.) and the solution left at ambient temperature overnight. It was then boiled under reflux for 30 minutes and then evaporated in vacuo to leave 1-benzyl-2,4-diethyl-2,4-di-iso-dithiobiuret hydroiodide. This dithiobiuret salt was shaken with ether (500 ml.) together with a solution of sodium hydroxide (27 g.) in water (250 ml.). The ether solution was then separated, dried over magnesium sulphate and the ether evaporated. The residual oil was treated with ethanol (150 ml.) containing hydrazine hydrate (50 g.) and the mixture boiled under reflux for 3 hours. The solution was then evaporated in vacuo and the residue crystallised from ethyl acetate to give 3-amino-5-benzylamino-1,2,4-triazole, M.P. 148–149° C.

EXAMPLE 20

By the method described in the first part of Example 6, 3,5-di(ethylamino)-1,2,4-triazole (5 g.) and methyl β-methoxy-α-methylacrylate (6.3 g.) were refluxed in ethanol containing sodium ethoxide derived from sodium hydride (1.62 g.; 50% oil dispersion). 2-ethylamino-4-ethyl-6-methyl-5 - oxo-4,5 - dihydro-s-triazolo[1,5-a]pyrimidine, M.P. 144–145° C., was isolated by chromatography and crystallised from cyclohexane.

The 3,5-di(ethylamino)-1,2,4-triazole, M.P. 160–161° C., was prepared by the method described in the second part of Example 6 using S-ethyl-N-ethylisothiourea hydrobromide and ethylisothiocyanate in place of the corresponding n-propyl derivatives.

EXAMPLE 21

3,5-di-(ethylamino)1,2,4-triazole (2 g.) was dissolved in ethanol (20 ml.) containing sodium ethoxide (1.8 g.) and ethyl acetoacetate (1.85 g.) added. The solution was boiled under reflux overnight. The ethanol was then evaporated in vacuo, water (30 ml.) added and the pH brought to pH 3 with dilute hydrochloric acid. The suspension was then extracted with chloroform (3 × 100 ml.) and the chloroform solution then washed with water (25 ml.), dried and evaporated. The resulting solid was crystallised from ethanol to give 2-ethylamino-4-ethyl-5-methyl-7-oxo - 4,7 - dihydro-s - triazolo[1,5-a]pyrimidine, M.P. 250–252° C.

EXAMPLE 22

3,5-di-(ethllamino)-1,2,4-triazole (2 g.), ethyl acetoacetate (1.85 g.) and glacial acetic acid (10 ml.) were boiled under reflux overnight. The solution was then cooled to give crystals of 2-ethylamino-4-ethyl-5-methyl-7-oxo-4,7-dihydro-s-triazolo[1,5-a]pyrimidine, M.P. 250–252° C., which were collected and rinsed with ether.

EXAMPLE 23

By the method described in Example 5, 2-ethylamino-4-ethyl-6-methyl-5-oxo - 4,5-dihydro-s-triazolo[1,4-a]pyrimidine was acetylated with acetic anhydride in pyridine to give 4-ethyl-2-N-ethylacetamido-6-methyl-5-oxo-4,5-dihydro-s-triazolo[1,5-a]pyrimidine, M.P. 78–79° C., which was crystallised from hexane.

EXAMPLE 24

2-amino-6-methyl-5 - oxo - 4-n-propyl-4,5-dihydro-s-triazolo[1,5-a]pyrimidine (10 g.), acetic anhydride (7.5 g.) and pyridine (15 ml.) were boiled under reflux for 16 hours and then left at ambient temperature for 48 hours. The solution was then diluted with ethylacetate (100 ml.) and extracted successively with 2 N hydrochloric acid (2× 100 ml.), water (100 ml.) 2 N sodium hydrogen carbonate (100 ml.) and water (100 ml.). The ethylacetate solution was then dried and evaporated, and the residual solid was crystallised from ethanol to give 2-acetamido-6-methyl-5-oxo-4-n - propyl - 4,5-dihydro-s-triazolo[1,5-a]pyrimidine, M.P. 170–172° C.

The mother liquors were evaporated and the residue chromatographed on a column of silica gel (250 g.) 50% ethyl acetate in hexane eluted a solid which crystallised from a mixture of benzene and hexane to give 2-N,N-diacetylamino-6-methyl-5 - oxo - 4-n-propyl-4,5-dihydro-s-triazolo[1,5-a]pyrimidine, M.P. 76–77° C.

EXAMPLE 25

Using the general procedure described in the first part of Example 8, 2-amino-5-oxo-4,5-dihydro-s-triazolo-[1,5-a]pyrimidine (10.75 g.) was alkylated with sodium hydride (3.7 g.; 50% oil dispersion) and 1-bromopropane (15 ml.) in dimethylformamide. The resulting 2-amino-5-oxo-4-n-propyl - 4,5 - dihydro-s-triazolo[1,5-a]pyrimidine, M.P. 158–160° C., was crystallised from ethylacetate.

The 2-amino-5-oxo-4,5-dihydro-s-triazolo[1,5-a]pyrimidine, M.P. 279–282° C., was prepared from guanazole and ethyl β,β-diethoxypropionate by the general method described in the second part of Example 8.

EXAMPLE 26

Using the general procedure described in the first part of Example 8, 2-amino-6-n-butyl-5-oxo-4,5-dihydro-s-triazolo[1,5-a]pyrimidine (5.5 g.) was alkylated with sodium hydride (1.15 g.; 50% oil dispersion) and 1-bromopropane (3.5 ml.) in dimethylformamide. The resulting 2-amino-6-n-butyl - 5 - oxo-4-n-propyl-4,5-dihydro-s-triazolo[1,5-a]pyrimidine, M.P. 106–107° C., was crystallised from cyclohexane.

The 2-amino-6-n-butyl-5-oxo - 4,5-dihydro-s-triazolo[1,5-a]pyrimidine, M.P. 255° C., was prepared from guanazole and ethyl α-(diethoxymethyl)hexanoate by the general method described in the second part of Example 8.

EXAMPLE 27

2-amino-6-methyl-5 - oxo - 4-n-propyl-4,5-dihydro-s-triazolo[1,5-a]pyrimidine (10 g.) was dissolved in boiling Tetralin (150 ml.) and phosphorus pentasulphide (10 g.) added. After 15 minutes heating under reflux, the reaction mixture was cooled and added to a column of neutral alumina (50 g.; grade II), wet with petroleum ether, B.P. 40–60° C. The column was eluted with petroleum ether, B.P. 40–60° C. to remove the Tetralin and then with 50% ethylacetate in the pertoleum ether which eluted a yellow solid. This solid was crystallised from cyclohexane to give 2-amino-6-methyl-4-n-propyl-5-thioxo-4,5-dihydro - s-triazolo[1,5-a]pyrimidine, M.P. 182–184° C.

EXAMPLE 28

A solution of bromine (0.28 ml.) and 2-amino-5-oxo-4-n-propyl - 4,5 - dihydro - s - triazolo[1,5-a]pyrimidine (0.97 g.) in glacial acetic acid was stirred during 18 hours at ambient temperature. The solid which separated was filtered, rinsed with ether and crystallised from water to give 2-amino-6-bromo-5-oxo-4-n-propyl-4,5-dihydro-s-triazolo[1,5-a]pyrimidine, M.P. 194–195° C.

EXAMPLE 29

A solution of 2-amino-6-methyl-5-oxo-4,5-dihydro-s-triazolo[1,5-a]pyrimidine (25 g.) in dimethylformamide (500 ml.) was added to sodium hydride (7.5 g.; 50% oil dispersion previously washed with light petroleum, B.P. 40–60° C.) and the solution stirred for 1 hour. 2-bromopropane (30 ml.) was added and the solution heated to 100° C. over 4 hours. The solvent was then evaporated in vacuo, water (200 ml.) added and the solution acidified with concentrated hydrochloric acid. The resulting suspension was extracted with chloroform (3× 250 ml.) and the chloroform solution then dried over magnesium sulphate and evaporated in vacuo. The residual solid was then chromatographed on a column of alumina (1,000 g.; grade II). 20% hexane in ethylacetate eluted a solid which crystallised from ethylacetate to give 2-amino-4-isopropyl-6-methyl-5-oxo - 4,5 - dihydro-s-triazolo[1,5-a] pyrimidine, M.P. 170–174° C.

Similarly, by using 2-bromobutane or cyclopentyl bromine in place of 2-bromopropane there is obtained 2-amino-4-s-butyl - 6 - methyl - 5 - oxo - 4,5 - dihydro-s-triazolo[1,5-a]pyrimidine, M.P. 108–109° C. or 2-amino-4-cyclopentyl - 6 - methyl - 5 - oxo - 4,5 - dihydro-s-triazolo-[1,5-a]pyrimidine, M.P. 162–166° C., respectively.

EXAMPLE 30

2-amino - 6 - methyl - 5 - oxo - 4,5 - dihydro-s-triazolo-[1,5-a]pyrimidine (25 g.) was alkylated with sodium hydride (7.5 g.; 50% oil dispersion) and 1-bromobutane (30 ml.) in dimethylformamide (400 ml.) using the general procedure described in the first part of Example 8. The total crude product was chromatographed on a column of alumina (500 g.; grade II). 40% ethyl acetate in hexane eluted a solid which crystallised from a mixture of ethylacetate and hexane to give 2-n-butylamino-4-n-butyl-6-methyl - 5 - oxo - 4,5 - dihydro-s-triazolo[1,5-a] pyrimidine, M.P. 82–83° C.

Continued elution with 10% ethanol in ethylacetate gave 2-amino-4-n-butyl - 6 - methyl - 5 - oxo-4,5-dihydro-s-triazolo[1,5-a]pyrimidine, M.P. 140–142° C. as the major product.

EXAMPLE 31

By the general method described in the first part of Example 8, 2-amino-5-oxo-6-n-propyl - 4,5 - dihydro-s-triazolo[1,5-a]pyrimidine (3.6 g.) was alkylated with sodium hydride (0.9 g.; 50% oil dispersion) and iodomethane (2.7 g.) in dimethylformamide (110 ml.). There was thus obtained 2-amino-4-methyl-5-oxo-6-n-propyl-4,5-dihydro-s-triazolo[1,5-a]pyrimidine, M.P. 206–207° C., which was crystallised from ethanol.

EXAMPLE 32

3,5-di-(ethylamino)-1,2,4-triazole (5 g.) and methyl β-methoxy-α-methylacrylate (6.3 g.) were boiled in glacial acetic acid for 50 hours. Water (100 ml.) was then added and the suspension extracted with chloroform (3× 100 ml.). The chloroform solution was washed successively with saturated sodium hydrogen carbonate solution (2× 50 ml.), and water (50 ml.) and dried. The chloroform was evaporated, and the residual solid boiled with light petroleum (50 ml., B.P. 40–60° C.) and the suspension filtered. The solid was then twice crystallised from ethyl acetate to give 2-ethylamino-4-ethyl-6-methyl-7-oxo-4,7-dihydro-s-triazolo[1,5-a]pyrimidine, M.P. 153–154° C.

EXAMPLE 33

The process described in Example 16 was repeated using methyl isocyanate in place of the phenyl isocyanate. There was thus obtained 2-(3-methylureido)-6-methyl-5-oxo-4-n-propyl - 4,5 - dihydro-s-triazolo[1,5-a]pyrimidine, M.P. 220–221° C.

EXAMPLE 34

2 - ethoxycarbonylamino - 6 - methyl - 5 - oxo - 4 - n-propyl - 4,5 - dihydro-s-triazolo[1,5-a]pyrimidine (2.8 g.) was dissolved in dimethylformamide (25 ml.) containing sodium hydride (0.5 g.; 50% oil dispersion, previously washed with petroleum ether, B.P. 40–60° C.). 1-bromo-ethylbenzene (2.0 g.) was added, and the solution stirred at ambient temperature for 1 hour. The solution was then diluted with ether (200 ml.) and washed with water (4× 25 ml.). The ether solution was then dried over magnesium sulphate, evaporated and the residue crystallised from petroleum ether, B.P. 40–60° C. to give 2-N-ethoxycarbonyl-N-α-phenylethylamino - 6 - methyl - 5 - oxo-4-n-propyl - 4,5 - dihydro - s triazolo[1,5-a]pyrimidine, M.P. 99–101° C.

The above process may be repeated using p-chlorobenzyl chloride in place of 1-bromoethylbenzene, to give 2 - N - ethoxycarbonyl - N - p - chlorobenzylamino-6-methyl - 5 - oxo - 4 - n - propyl - 4,5 - dihydro-s-triazolo[1,5-a]pyrimidine, M.P. 110° C.

Similarly, by using iodomethane in place of 1-bromoethylbenzene, 2-N-ethoxycarbonyl - N - methylamino-6-methyl - 5 - oxo - 4 - n - propyl - 4,5 - dihydro-s-triazolo-[1,5-a]pyrimidine is obtained.

EXAMPLE 35

A solution of 2-N-ethoxycarbonyl-N-p-chlorobenzyl-amino-6-methyl - 5-oxo-4-n-propyl-4,5-dihydro-s-triazolo-[1,5-a]pyrimidine (3 g.) and sodium hydroxide (1.0 g.) in methanol (100 ml.) was allowed to stand at ambient temperature for 50 hours. The solution was then acidified with dilute hydrochloric acid and evaporated in vacuo.

The residue was shaken with ether (150 ml.) and water (50 ml.), and the ether layer separated, washed with water (50 ml.), dried over magnesium sulphate and evaporated. The residue was crystallised from cyclohexane to give 2-p-chlorobenzylamino-6-methyl-5-oxo - 4 - n-propyl-4,5-dihydro-s-triazolo[1,5-a]pyrimidine, M.P. 109–110° C.

EXAMPLE 36

A solution of 2-N-ethoxycarbonyl-N-methylamino-6-methyl-5-oxo-4-n - propyl - 4,5 - dihydro-s-triazolo[1,5-a]pyrimidine (5 g.) and sodium hydroxide (1 g.) in methanol (50 ml.) was left at ambient temperature for 18 hours. The volume was then reduced to one third by evaporation in vacuo and water (50 ml.) added. The resulting suspension was extracted with chloroform (3× 100 ml.), and the chloroform solution then dried and evaporated. The residual solid was twice crystallised from ethylacetate to give 2-methylamino-6-methyl-5-oxo-4-n-propyl-4,5-dihydro-s-triazolo[1,5-a]pyrimidine, M.P. 162–164° C.

EXAMPLE 37

A solution of 2-ethoxycarbonylamino-6-methyl-5-oxo-4-n-propyl-4,5-dihydro - s-triazolo[1,5-a]pyrimidine (2.07 g.) and sodium hydroxide (0.8 g.) in methanol (100 ml.) was allowed to stand at ambient temperature for 48 hours. The solution was then acidified with dilute hydrochloric acid and evaporated in vacuo. The residue was shaken with chloroform (100 ml.) and water (50 ml.) and the chloroform layer separated, washed with water (25 ml.), dried over magnesium sulphate, and evaporated in vacuo. The residue was crystallised from ethylacetate to give 2-amino-6-methyl-5-oxo-4-n-propyl - 4,5 - dihydro - s - triazolo[1,5-a]pyrimidine, M.P. 164–165° C.

EXAMPLE 38

A solution of 2-hydroxymethyl-6-methyl-5-oxo-4,5-dihydro-s-triazolo[1,5-a]pyrimidine (1.8 g.) in dimethylformamide was alkylated with sodium hydride (0.5 g.; 50% oil dispersion) and 1-bromopropane (3 ml.) using the general procedure described in the first part of Example 8 to give 2-hydroxymethyl-6-methyl-5-oxo-4-n-propyl-4,5-dihydro-s-triazolo[1,5 - a]pyrimidine, M.P. 154–156° C.

The 2-hydroxymethyl - 6 - methyl-5-oxo-4,5-dihydro-s-triazolo[1,5-a]pyrimidine, M.P. 261° C. was prepared from 3-amino-5-hydroxymethyl-1,2,4-triazole and methyl β-methoxydimethylacrylate by the general method described in the second part of Example 8.

The 3-amino-5-hydroxymethyl-1,2,4-triazole, M.P. 188–190° C., was prepared by the method described by Allen et al., J. Org. Chem., 24, 793, 1959. The product obtained was the 3-amino-5-hydroxymethyl-1,2,4-triazole and not its glycolate ester, M.P. 113–115° C. described by Allen et al.

EXAMPLE 39

A solution of 2-hydroxymethyl-6-methyl-5-oxo-4-n-propyl-4,5-dihydro-s-triazolo[1,5-a]pyrimidine (1.94 g.) in acetone (100 ml.) was treated dropwise, with stirring, with 5 ml. of a solution of chromium trioxide (26.72 g.) in concentrated sulphuric acid (23 ml.) and water (to make up to 100 ml.). The suspension was then stirred for a further 20 minutes before the acetone was evaporated in vacuo at ambient temperature. The residue was stirred with water (20 ml.) and the resulting suspension filtered, and the solid washed with water (20 ml.) and acetone and then crystallised from water to give 2-carboxy - 6 - methyl-5-oxo-4-n-propyl-4,5-dihydro-s-triazolo-[1,5-a]pyrimidine, M.P. 223–224° C.

EXAMPLE 40

2-methoxycarbonyl - 6 - methyl - 5-oxo-4-n-propyl-4,5-dihydro-s-triazolo[1,5-a]pyrimidine (1.5 g.) and concentrated ammonia solution (s.g. 0.88) (25 ml.) were heated together on the steam bath for 15 minutes. The solid was then collected by filtration, and washed with water and acetone and then crystallised from ethanol to give 2 - carbamoyl - 6 - methyl-5-oxo-4-n-propyl-4,5-dihydro-s-triazolo[1,5-a]pyrimidine, M.P. 242–243° C.

The starting 2-methoxycarbonyl derivative was prepared as follows:

A solution of 2-carboxy-6-methyl-5-oxo-4-n-propyl-4,5-dihydro-s-triazolo[1,5-a]pyrimidine (6.0 g.) in methanol (100 ml.) and chloroform (50 ml.) is treated with a slight excess of diazomethane in ether. The reaction mixture is evaporated to give 2-methoxycarbonyl-6-methyl-5-oxo-4-n - propyl - 4,5 - dihydro-s-triazolo[1,5-a]pyrimidine, M.P. 196–197° C.

EXAMPLE 41

A solution of 2-methoxycarbonyl-6-methyl-5-oxo-4-n-propyl-4,5-dihydro-s-triazolo[1,5-a]pyrimidine (1.5 g.) and hydrazine hydrate (1.0 ml.) in ethanol (50 ml.) was boiled under reflux for 2 hours, and then cooled. The crystalline solid so formed was collected to give 2-carbazoyl - 6-methyl-5-oxo-4-n-propyl-4,5-dihydro-s-triazolo-[1,5-a]pyrimidine, M.P. 211–212° C.

EXAMPLE 42

To a solution of 2-carbazoyl-6-methyl-5-oxo-4-n-propyl-4,5-dihydro-s-triazolo[1,5-a]pyrimidine (50 mg.) in ethanol (1 ml.), water (1 ml.) and 2 N hydrochloric acid (0.2 ml.) at 0° C., sodium nitrite (14 mg.) was added with stirring. After 15 minutes, chloroform (3 ml.) and water (3 ml.) were added. The chloroform solution was separated, washed with water (2 ml.) and dried over magnesium sulphate. Ethanol (10 ml.) was added to the chloroform solution and the volume maintained by continuous addition of ethanol while the solution was boiled without a condenser for 1 hour. The solution was then evaporated in vacuo and the residue crystallised from cyclohexane to give 2-ethoxycarbonylamino-6-methyl-5-oxo - 4-n-propyl-4,5-dihydro-s-triazolo[1,5-a]pyrimidine, M.P. 173° C.

EXAMPLE 43

By the general method described in the first part of Example 8, 2-amino-6-β-hydroxyethyl-5-oxo-4,5-dihydro-s-triazolo[1,5-a]pyrimidine (1.35 g.) was alkylated with sodium hydride (0.36 g.; 50% oil dispersion) and 1-bromopropane (3 ml.) in dimethylformamide (100 ml.). There was thus obtained 2-amino-6-β-hydroxyethyl-5-oxo-4 - n-propyl-4,5-dihydro-s-triazolo[1,5-a]pyrimidine, M.P. 143–145° C., which was crystallised from ethylacetate.

The 2 - amino-6-β-hydroxyethyl-5-oxo-4,5-dihydro-s-triazolo[1,5-a]pyrimidine, M.P. 259–260° C., was prepared from guanazole and α-diethoxymethyl-γ-butyrolactone, by the general method described in the second part of Example 8.

EXAMPLE 44

Pharmaceutical compositions containing an s-triazolo-[1,5-a]pyrimidine derivative may be prepared from any s-triazolo[1,5-a]pyrimidine derivative of the invention as illustrated in the foregoing examples by conventional procedures as illustrated below in which the active ingredient is named as 2-amino-6-methyl-5-oxo-4-n-propyl-4,5-dihydro-s-triazolo[1,5-a]pyrimidine, but in which it is to be understood that the amount of this particular active ingredient may be replaced by an equipotent amount of any other illustrated s-triazolo[1,5-a]pyrimidine derivative of the invention.

AEROSOL

An aerosol which contains the active ingredients can be prepared as follows whereby the figures given relate to a single measured dose:

2 - amino-6-methyl-5-oxo-4-n-propyl-4,5-dihydro-s-triazolo[1,5-a]pyrimidine, mg. _____ 1
Oleic acid, μg. _____ 10
Dichlorodifluoromethane, mg. _____ 61
Trichlorofluoromethane, mg. _____ 24

The active ingredient, the oleic acid and a portion of the dichlorodifluoromethane are mixed. The suspension is then diluted with the rest of the dichlorodifluoromethane and the required amount is placed into aluminium aerosol containers which are sealed by a suitable measuring valve. The containers are then brought under pressure with the trichlorofluoromethane.

TABLET (a) An initimate mixture of 2-amino-6-methyl-5-oxo-4-n-propyl-4,5-dihydro-s-triazolo[1,5-a]pyrimidine (4.5% by weight), maize starch (31% by weight), calcium phosphate (63% by weight) and magnesium stearate (0.5% by weight) is compressed, and the compressed mixture is then broken down into granules by passage through a 16-mesh screen. The resultant granules are then compressed into tablets which may contain from 1 to 10 mg. of the active ingredient. There are thus obtained tablets suitable for oral use for therapeutic purposes.

(b) An intimate mixture of 2-amino-6-methyl-5-oxo-4-n-propyl - 4,5 - dihydro-s-triazolo[1,5-a]pyrimidine (25% by weight), granular mannitol (95.5% by weight), magnesium stearate (1% by weight) and stearic acid (1% by weight) is compressed into tablets which may contain from 1 to 5 mg. of the active ingredient. There are thus obtained soluble tablets suitable for administering under the tongue.

OINTMENT

A mixture having the composition:

Percent by weight
2 - amino-6-methyl-5-oxo-4-n-propyl-4,5-dihydro-s-triazolo[1,5-a]pyrimidine _____ 2
Liquid paraffin _____ 10
Soft white paraffin _____ 88 is prepared by adding the active ingredient to a stirred mixture of the paraffins heated at 65° C. The mixture is allowed to cool and the stirring is continued until the mixture is cool. There is thus obtained an ointment suitable for topical application for therapeutic purposes.

CREAM

A mixture having the composition:

Percent by weight
2 - amino-6-methyl-5-oxo-4-n-propyl-4,5-dihydro-s-triazolo[1,5-a]pyrimidine _____ 1
Stearic acid _____ 20
Arachis oil _____ 14
Liquid paraffin _____ 4.5
Cetostearyl alcohol _____ 5
Triethanolamine _____ 2.5
Water _____ 53 is prepared by adding a solution at 60° C. prepared from the active ingredient, the triethanolamine and the water, to a stirred mixture of the stearic acid, arachis oil, liquid paraffin and cetostearyl alcohol, heated at 65° C. Stirring is continued after mixing while the temperature is allowed to fall to 40° C. The mixture is then homogenised by passing through a colloid mill. There is thus obtained a vanishing cream suitable for topical application for therapeutic purposes.

What I claim is:

1. A pharmaceutical composition for preventing bronchospasm or reducing body fat comprising a therapeutically administrable amount of a triazolo-pyrimidine of the formula:

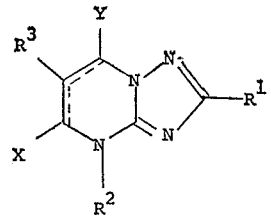

wherein $R^1$ is selected from the group consisting of amino, amino bearing one or two acyl groups of the formula $R^4 \cdot CO-$ or $R^4 \cdot CS-$, wherein $R^4$ is alkyl or alkoxy of 1–4 carbon atoms, phenyl or halophenyl; alkylamino of 1–4 carbon atoms, phenylalkylamino and (halophenyl) alkylamino each of 7–10 carbon atoms; acyl-(alkylamino of 1–4 carbon atoms) and acylphenylalkylamino and (halophenyl)alkylamino each of 7–10 carbon atoms wherein the acyl group is as defined above; dialkylamino in which each alkyl is of 1–4 carbon atoms, ureido, phenylureido, halophenylureido, methylureido, hydroxymethyl, carbamoyl and carbazoyl; $R^2$ is selected from the group consisting of alkyl of 1–6 carbon atoms, cyclopentyl and allyl; $R^3$ is selected from the group consisting of hydrogen, halogen, alkyl and hydroxyalkyl each of 1–6 carbon atoms; one of X and Y is oxo or thioxo and the other of X and Y is selected from the group consisting of hydrogen and methyl, and wherein when X is oxo or thioxo, the nucleus contains a double bond between positions 6 and 7, and Y is oxo or thioxo, the nucleus contains a double bond between positions 5 and 6, and a major amount of a pharmaceutically-acceptable diluent or carrier.

2. A method of preventing bronchospasm in a host requiring such treatment which comprises administering to said host an effective amount of a triazolo-pyrimidine as defined in claim 1.

3. A method of reducing body fat in a host requiring such reduction which comprises administering to said host an effective amount of a triazolo-pyrimidine as claimed in claim 1.

References Cited
UNITED STATES PATENTS 3,202,512  8/1965  Williams _____ 260—256.4
3,271,401  9/1966  Williams _____ 260—256.4

STANLEY J. FRIEDMAN, Primary Examiner